United States Patent
Huang

(10) Patent No.: US 8,292,466 B2
(45) Date of Patent: Oct. 23, 2012

(54) LENS FOR LIGHT EMITTING DIODE

(75) Inventor: Shan-Fu Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 406 days.

(21) Appl. No.: 12/775,491

(22) Filed: May 7, 2010

(65) Prior Publication Data
US 2011/0051426 A1     Mar. 3, 2011

(30) Foreign Application Priority Data
Aug. 28, 2009   (CN) .......................... 2009 1 0306277

(51) Int. Cl.
*F21V 13/04* (2006.01)
(52) U.S. Cl. ......... 362/309; 362/329; 362/308; 362/331
(58) Field of Classification Search .................. 362/309, 362/329, 331, 307, 308, 326, 327, 311.02, 362/800; 257/98; 359/742
See application file for complete search history.

(56) References Cited

U.S. PATENT DOCUMENTS

| | | | | |
|---|---|---|---|---|
| 3,875,456 A | * | 4/1975 | Kano et al. | 313/501 |
| 7,118,262 B2 | * | 10/2006 | Negley | 362/555 |
| 7,126,273 B2 | * | 10/2006 | Sorg | 313/512 |
| 7,172,325 B2 | * | 2/2007 | Kim et al. | 362/561 |
| 7,748,872 B2 | * | 7/2010 | Holder et al. | 362/308 |
| 7,967,471 B2 | * | 6/2011 | Brune et al. | 362/267 |
| 7,988,337 B2 | * | 8/2011 | Huang | 362/299 |
| 2006/0067079 A1 | * | 3/2006 | Noh et al. | 362/327 |
| 2008/0019136 A1 | * | 1/2008 | Mertens et al. | 362/309 |
| 2010/0238669 A1 | * | 9/2010 | Holder et al. | 362/311.02 |
| 2011/0110101 A1 | * | 5/2011 | Fu et al. | 362/311.02 |

* cited by examiner

*Primary Examiner* — Bao Q Truong
(74) *Attorney, Agent, or Firm* — Altis Law Group, Inc.

(57) ABSTRACT

A lens includes a first transparent member and a second transparent member. The first transparent member includes a bottom surface, a Fresnel lens surface and a first sidewall. An LED is received in the bottom surface. The Fresnel lens surface is configured for aligning the light from the LED. The first sidewall is configured for refracting the light from the LED. The second transparent member includes a second bottom surface, an upper surface and a second sidewall. A second receiving portion is defined in the second bottom surface for receiving the first transparent member. The upper surface is configured for reflecting the light through the Fresnel lens surface so that the light is redirected to radiate laterally. The laterally radiated light transmits out of the lens through the second sidewall.

9 Claims, 5 Drawing Sheets

LENS FOR LIGHT EMITTING DIODE

BACKGROUND

1. Technical Field

The disclosure relates generally to lenses, and more particularly to a lens for deflecting light generated by a light emitting diode laterally.

2. Description of the Related Art

Light emitting diodes (LEDs) are widely used in backlight modules of liquid crystal display televisions (LCD TVs). Recently, LCD TVs with edge-lighting backlight modules are popular. Since the LED is a point light source, light is emitted by the LED in all directions. When LEDs are used in edge-lighting backlight modules, light from the LEDs is not diffracted effectively by simple structural light guide plates. Light guide plates must be constructed in specific pattern in order to provide effective redirection. Moreover, the thickness of the backlight module is not reduced by the size of the LED. Thus, what is called for is a lens used with an LED that can overcome the limitations described.

DETAILED DESCRIPTION

Figure 1:
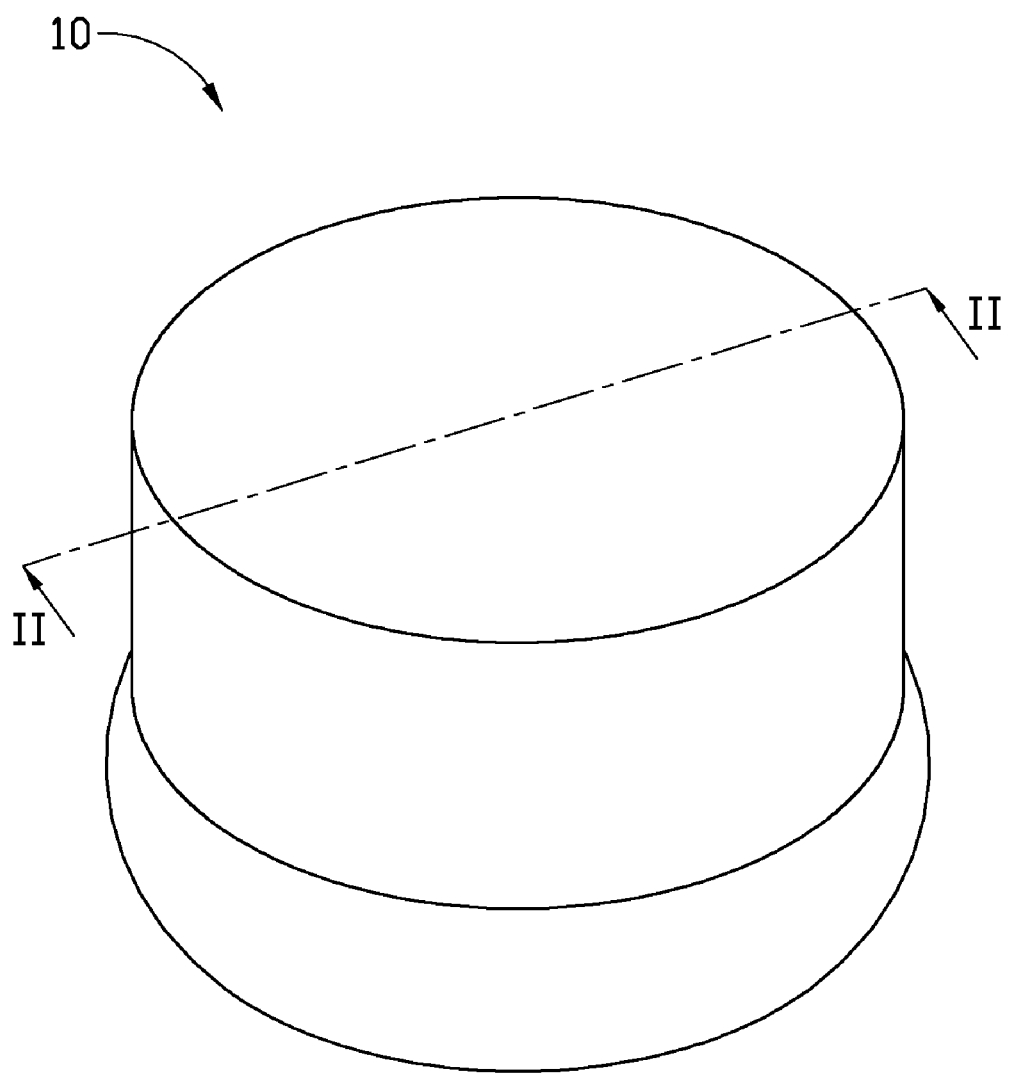
FIG. 1 is an isometric view of a lens in accordance with one embodiment of the disclosure.
Figure 2:
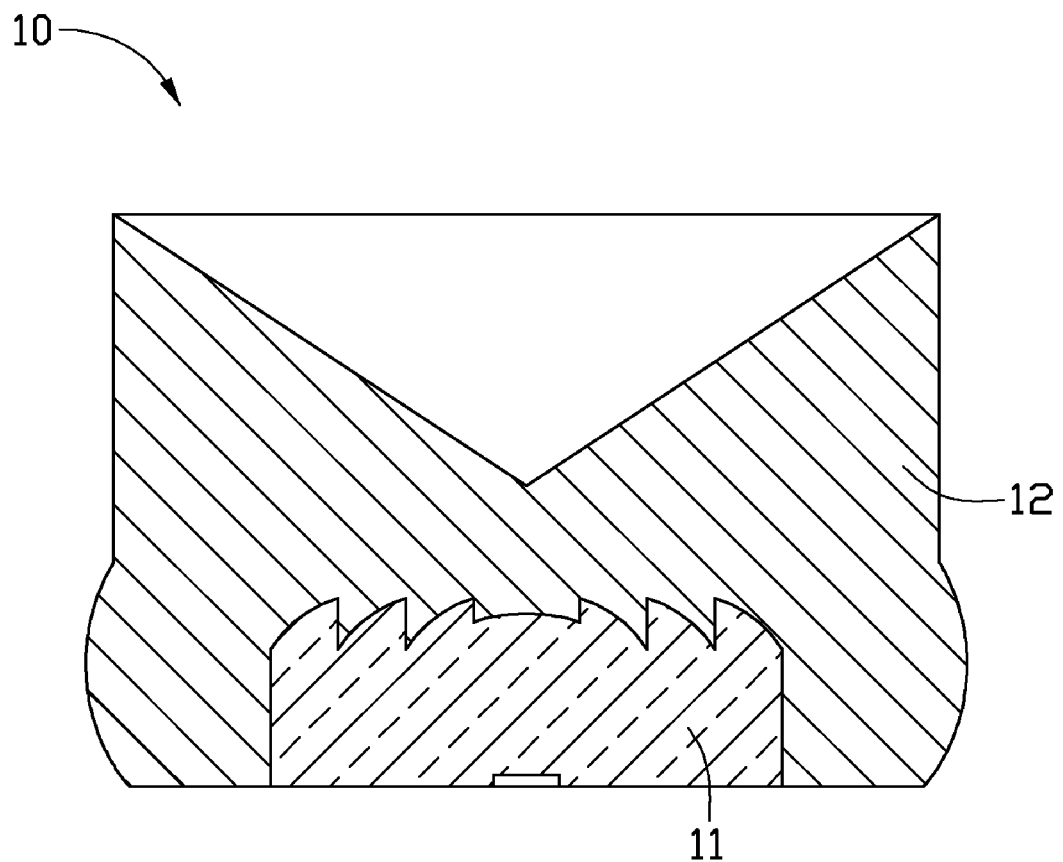
FIG. 2 is a cross-section along line II-II of the lens in FIG. 1.

Referring to FIG. 1 and FIG. 2, a lens 10 in accordance with one embodiment of the present disclosure includes a first transparent member 11 and a second transparent member 12 over and enclosing the first transparent member 11. The refractive index of the first transparent member 11 exceeds that of the second transparent member 12.

Figure 3:
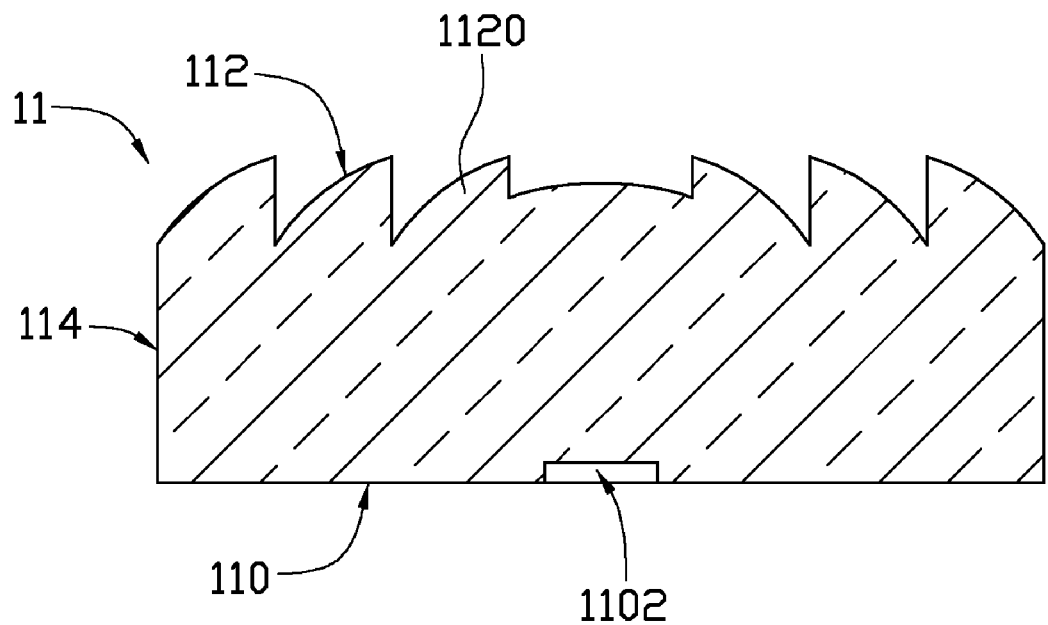
FIG. 3 is a cross-section of a first transparent member of the lens in FIG. 2.

Referring to FIG. 3, the first transparent member 11 is columnar and includes a bottom surface 110, a Fresnel lens surface 112 and a first sidewall 114. The Fresnel lens surface 112 and the first sidewall 114 are surrounded by the second transparent member 12, while the bottom surface 110 is exposed to an outside.

A first receiving portion 1102 is defined in the bottom surface 110, configured for receiving an LED 20 (FIG. 5) therein. The Fresnel lens surface 112 is opposite to the bottom surface 110. The first sidewall 114 is between the bottom surface 110 and the Fresnel lens surface 112. The surface of the first receiving portion 1102 is an incident surface of the light from the LED 20 into the first transparent member 11 of the lens 10.

The Fresnel surface 112 includes a plurality of semispherical convex surfaces 1120. The LED received in the receiving portion 1102 is located at the focal point of the Fresnel lens surface 112. The Fresnel lens surface 112 is configured for aligning light passing therethrough. The first sidewall 114 is configured for refracting light passing therethrough into the second transparent member 12.

Figure 4:
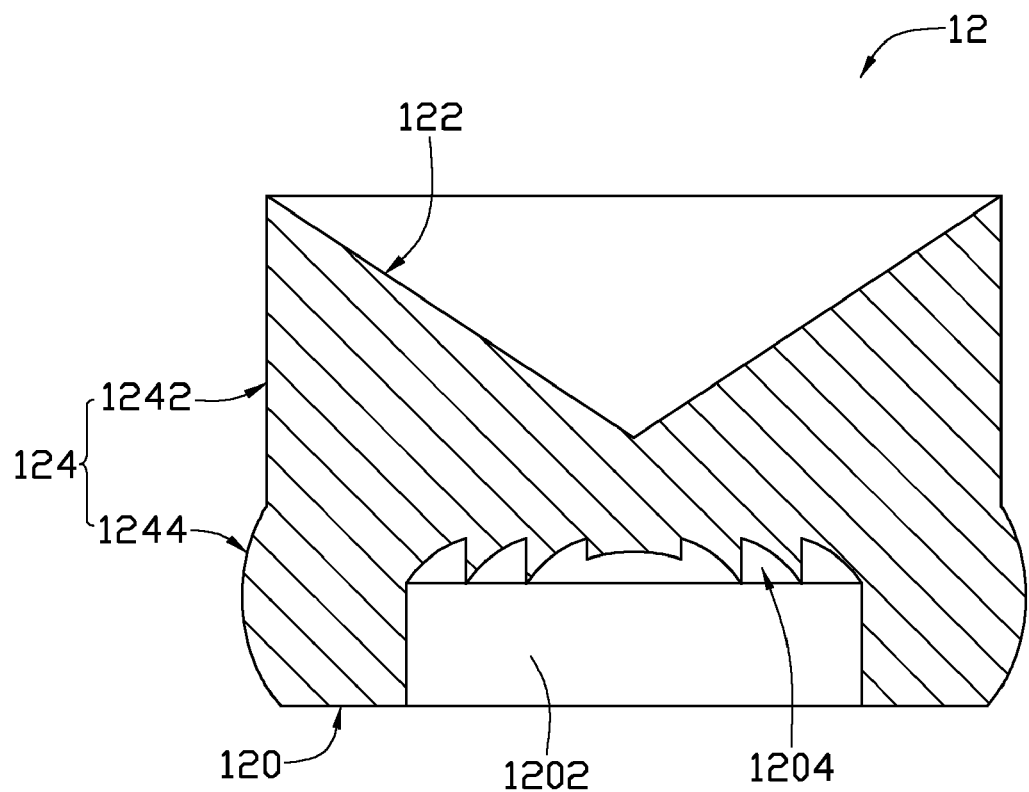
FIG. 4 is a cross-section of a second transparent member of the lens in FIG. 2.

Referring to FIG. 4, the second transparent member 12 is columnar and includes a second bottom surface 120, an upper surface 122 and a sidewall 124. A second receiving portion 1202 is defined in the second bottom surface 120. The second bottom surface 120 is opposite to the upper surface 122. The sidewall 124 is between the bottom surface 120 and the upper surface 122.

A plurality of depressions 1204 is defined in the second receiving portion 1202. The first transparent member 11 is received precisely in the second receiving portion 1202, due to the shape of the depressions 1204 in whole matching that of the semispherical convex surfaces 1120 in whole. In other words, the second bottom surface 120 defining the depressions 1204 has a profile matching that of the Fresnel lens surface 112.

The upper surface 122 is conical with a tip (not labeled) thereof pointing downwardly toward the first transparent member 11. Optimally, a reflective film is coated on the upper surface 122 for reflecting the light through second transparent member 12.

The second sidewall 124 includes a first passing surface 1242 and a second passing surface 1244. The first passing surface 1242 and the second passing surfaces 1244 have different profiles. The first passing surface 1242 is linear while the second passing surface 1244 is convexly curved.

Figure 5:
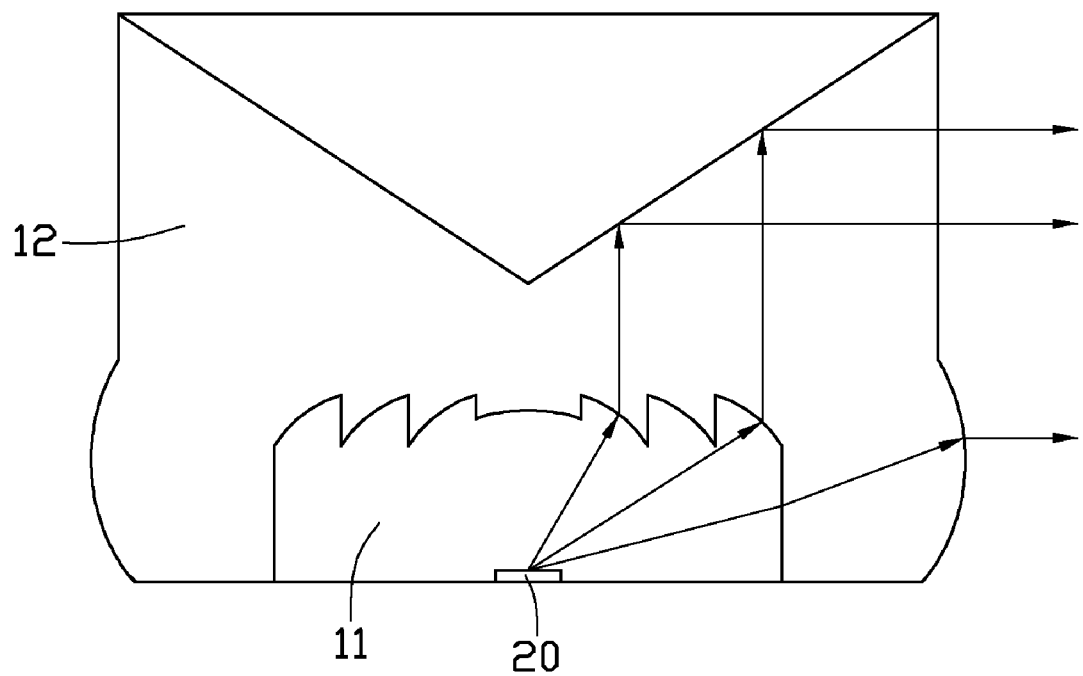
FIG. 5 is an optical path view of the lens in FIG. 2 with an LED.

Referring to FIG. 5, the LED 20 is received in the first receiving portion 1102 of the first transparent member 11. The light from the LED 20 is emitted into the first transparent member 11. The LED 20 is a top view LED whose light radiates upwardly from a top face (not labeled) thereof.

Light through the Fresnel lens surface 112 is aligned perpendicular to the bottom surface 120. When the light through the Fresnel lens surface 112 reaches the upper surface 122, the light is reflected and transmitted through the first passing surface 1242 parallel to the second bottom surface 120.

The light through the first sidewall 114 is refracted to the second transparent member 12. The light is aligned through the second passing surface 1244 parallel to the second bottom surface 120.

In conclusion, the light emitted by the LED 20 is converted to lateral light through the lens 10. Moreover, the thickness of backlight module can be minimized when the lens 10 of the disclosure with the LED 20 is used in the backlight module.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens comprising:
   a first transparent member comprising a bottom surface, a Fresnel lens surface and a first sidewall, a first receiving portion defined in the bottom surface and configured for receiving an LED, the Fresnel lens surface configured for aligning light from the LED, the first sidewall configured for refracting the light from the LED, the first sidewall being located between the Fresnel lens surface and the bottom surface; and
   a second transparent member comprising a second bottom surface, an upper surface and a second sidewall, a second receiving portion defined in the second bottom surface and receiving the first transparent member therein, the upper surface configured for reflecting the light through the Fresnel lens surface to radiate laterally, the second sidewall comprising a first passing surface and a second passing surface, the first passing surface configured for transmitting the light reflected by the upper surface, and the second passing surface configured for refracting the light through the first sidewall, the first and second passing surface having different profiles.

2. The lens as claimed in claim 1, wherein the second passing surface is a convexly curved surface and the first passing surface is linear.

3. The lens as claimed in claim 1, wherein a refractive index of the first transparent member exceeds that of the second transparent member.

4. The lens as claimed in claim 1, wherein the first transparent member and the second transparent are columnar.

5. The lens as claimed in claim 1, wherein the surface of the first receiving portion is the incident surface of the first transparent member.

6. The lens as claimed in claim 5, wherein the first receiving portion is located at the focal point of the Fresnel lens surface.

7. A lens/light emitting diode combination comprising:
  a lens comprising:
    a first transparent member having a top Fresnel lens surface;
    a second transparent member over and enclosing the first transparent member and having a top reflective surface with a conical configuration with a tip pointing downwardly toward the first transparent member;
    a top view LED received in a bottom surface of the first transparent member, in which a part of light generated by the LED is transmitted upwardly through the top Fresnel lens surface of the first transparent member, then reflected by the top reflective surface of the second transparent member and finally radiated laterally out of the second transparent member of the lens, while another part of the light generated by the LED is radiated upwardly and laterally through the first transparent member and refracted by a lateral side of the second transparent member to radiate laterally outward of the second transparent member of the lens.

8. The combination of claim 7, wherein the lateral side of the second transparent member comprises a first passing surface and a second passing surface below the first passing surface, the second passing surface having a convex profile and the first passing surface having a linear profile.

9. The combination of claim 7, wherein a refractive index of the first transparent member exceeds that of the second transparent member.

* * * * *